T859,002

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 41

616,504

POLYESTERS AND POLYCARBONATES PREPARED FROM CYANO SUBSTITUTED BISPHENOLS

Paul Winthrop Morgan, West Chester, Pa., assignor to E. I. du Pont de Nemours and Company, Wilmington, Del., a corporation of Delaware

Filed Feb. 16, 1967. Published Feb. 4, 1969

Class 260—47

No Drawing. 18 Pages Specification

Novel polyesters and copolyesters are prepared from mono- and dicyano-substituted bisphenols wherein each cyano group is attached to a methylene carbon atom bridging the phenolic rings. Novel polycarbonates and copolycarbonates prepared from dicyano-substituted bisphenols of the type described above. High melting fibers and films having good thermal stability are prepared from these polymers.